March 31, 1953  H. W. TREVASKIS  2,633,000
HYDRAULICALLY ACTUATED WINDSCREEN WIPER MECHANISM
Filed Oct. 6, 1948  2 SHEETS—SHEET 1

INVENTOR
Henry William Trevaskis
by Benjn. T. Rauber
his attorney

March 31, 1953　　　H. W. TREVASKIS　　　2,633,000
HYDRAULICALLY ACTUATED WINDSCREEN WIPER MECHANISM
Filed Oct. 6, 1948　　　　　　　　　　　　　　2 SHEETS—SHEET 2
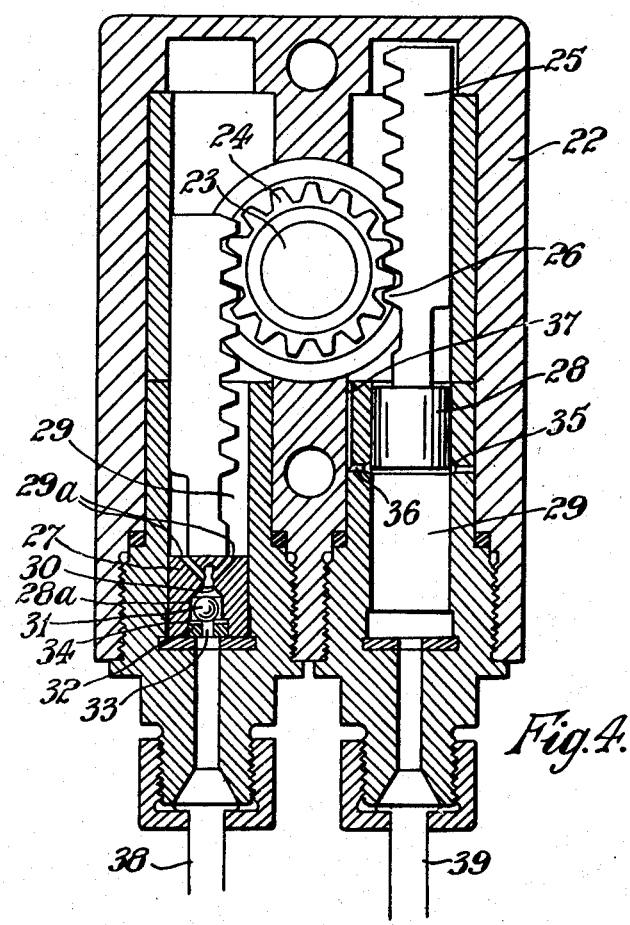
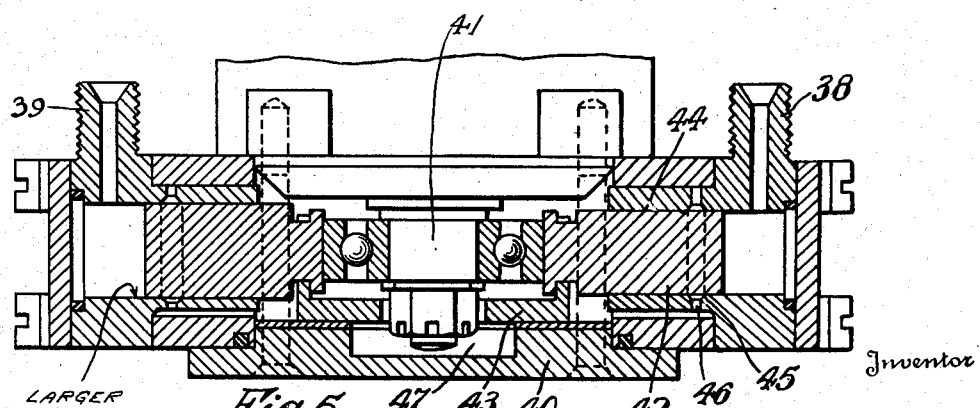
Inventor
HENRY WILLIAM TREVASKIS
By Benj. T. Rauber
Attorney Patented Mar. 31, 1953

2,633,000

UNITED STATES PATENT OFFICE 2,633,000

HYDRAULICALLY ACTUATED WINDSCREEN WIPER MECHANISM

Henry William Trevaskis, Solihull, England, assignor to Dunlop Rubber Company Limited, London, England, a British company Application October 6, 1948, Serial No. 53,022
In Great Britain November 1, 1947

4 Claims. (Cl. 60—54.5)

This invention relates to windscreen wipers and more specifically to windscreen wiper apparatus operated by a hydraulic system.

The object of this invention is to provide a windscreen wiper which is of a simplified nature, which is self bleeding in operation and which is lighter in weight and easier to install than previously known apparatus.

According to the invention a hydraulic windscreen wiper system comprises a windscreen wiper unit and a two-throw pump, the said wiper unit comprising a housing, a pinion therein mounted on a shaft adapted to carry a wiper blade, two racks diametrically situated with respect to the said pinion, two cylinders and single acting pistons, the said cylinders being adapted to be connected to the said pump and each piston being associated with one of the two said racks, whereby the motion of one piston in one direction moves the other piston in the opposite direction, and means for returning to the said pump excess liquid pumped to the said cylinders.

In order that the invention may be more fully described reference is made to the following drawings in which:

Fig. 4 is a sectional front elevation of another embodiment of a wiper unit.

Fig. 5 is a half-sectional side elevation of the pump unit associated with said wiper unit.

Figures 1, 2:
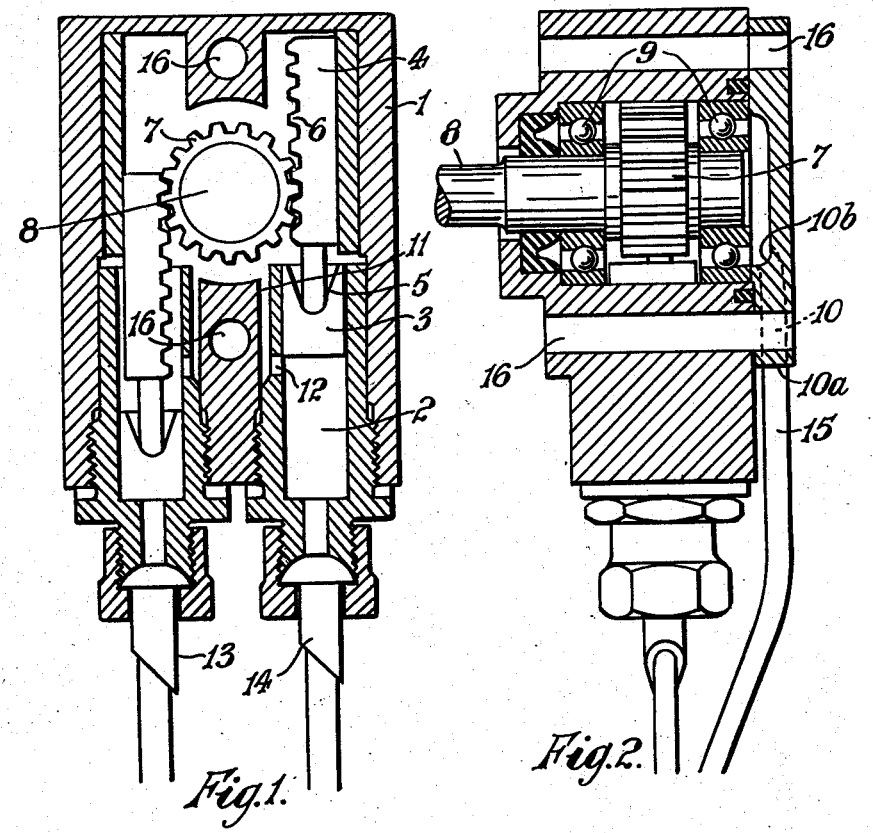
Fig. 1 is a sectional front elevation of one embodiment of the wiper unit.
Fig. 2 is a sectional side elevation of the same wiper unit.
Figure 3:
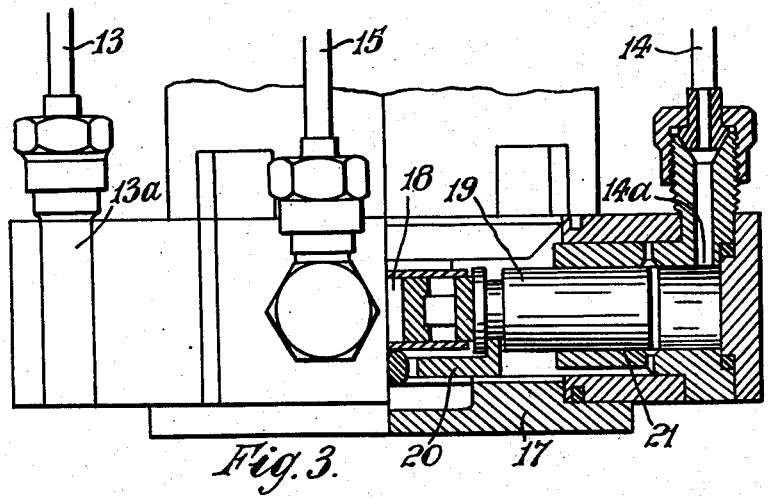
Fig. 3 is a half-sectional side elevation of the pump unit associated with the wiper unit.

In one embodiment of the invention an improved hydraulic windscreen wiper apparatus, suitable for fitting to an aircraft consists of a wiper unit, Figs. 1 and 2, and a pump unit, Fig. 3. The wiper unit comprises a housing 1 in which two parallel vertical cylinders 2 of equal capacity are disposed side by side, and a single acting piston 3 is housed within each cylinder. The lower end of a rack 4 is housed within a socket 5 in the upper end of each piston and the two racks are parallel and extend side by side with the teeth 6 formed on adjacent sides thereof. Disposed between the racks is a pinion 7 which engages the racks on either side of its diameter and which is keyed to a shaft 8 rotatably supported by bearings 9 in the housing, the wiper arm being attached to said shaft. A vertically disposed liquid return passage 10 is formed between the cylinders and extends to the exterior of the body at its lower end 10a and opens into the exterior of the body at its upper end 10b. Two opposed escape ducts 11 lead from the passage and form ports 12 in the walls of the two cylinders adjacent the upper ends of said cylinders.

Pipe connections 13 and 14 extend from the lower or head end of each cylinder and another pipe connection 15 extends from the return passage. All three pipe connections are coupled to a pump unit in a manner to be hereinafter described. The housing is further provided with two holes 16 for connecting said housing to a portion of the aircraft adjacent the windscreen.

The pump unit Fig. 3 comprises a casing 17 in which is mounted in suitable bearings a crankshaft 18 adapted to be rotated by reduction gearing from an electric motor secured to the casing. The crankshaft reciprocates two pistons 19 retained together by a cradle-like component 20 and housed in separate cylinders 21 which are disposed diametrically opposite each other relative to the crankshaft bearing axis, and which are secured to the casing. This pump arrangement is herein termed a two-throw pump.

The pipe 13 from one cylinder in the wiper unit is connected to the head end 13a of a cylinder in the pump unit and the other cylinder of the wiper unit is connected by a similar pipe 14 to the head end 14a of the other cylinder in the pump unit. The pipe 15 connected to the return passage in the wiper unit is also connected to the casing of the pump and inlet passages lead from the pipe connection in the casing to the pump cylinders and form ports in the walls thereof remote from the head ends of said cylinders.

The operation of the apparatus is as follows. Liquid is introduced in any convenient manner to the four cylinders and associated pipes. On starting the electric motor the crankshaft is thereby rotated to reciprocate the pump pistons so that, considering one pump cylinder, liquid is expelled therefrom and passes along its respective pipe into a wiper unit cylinder whereby the associated piston is traversed to move its rack and so partially rotate the pinion and wiper arm. Rotation of the pinion also moves the other rack so that the two racks move in opposite directions and said other rack traverses its respective piston to expel liquid from its associated cylinder and said liquid passes via the respective pipe units to the appropriate pump cylinder. Continuation of rotation of the crankshaft causes periodic reversals of this operation. The volume of liquid displaced by each pump piston during its pressure stroke is such that during the latter part of said pressure stroke the associated piston in the wiper unit uncovers the port in its cylinder to allow any excess of fluid to escape from the hydraulic system through a duct in the upper end of the return passage and into the housing. Liquid can also pass from said cylinder along said escape duct to the return passage, and through the respective pipe to the pump unit, where it re-enters the pump cylinders prior to subsequent pressure strokes of the pump piston. The hydraulic system is therefore self-bleeding.

A valve may be located at the upper end of the return passage, said valve being normally open to allow of egress of air from the passage into the housing and being automatically closed to prevent loss of liquid should the wiper unit be inverted.

In another embodiment of this invention Fig. 4 a wiper unit comprises a housing 22 in which is mounted a shaft 23 coupled to a wiper arm. Integral with the shaft is a pinion 24 which is engaged at diametrically opposite positions by two racks 25 disposed parallel to each other with the teeth 26 formed on adjacent sides thereof. The lower ends of the two racks are associated one with the upper end of one piston 27 and the other with the upper end of another piston 28, both pistons operating in cylinders 29 formed in the housing, said cylinders being of equal capacity and disposed parallel and side by side.

One of said pistons 27 is provided with a chamber 28a centrally of its face and terminating in two smaller holes 29a which extend at an angle through the crown of the piston. The inner extremity of said chamber 30 forms a seating for a ball 31 which is retained in the chamber by an annular member 32 provided centrally with a hole 33 and its inner surface provided with a plurality of radial slots 34. The whole comprises a ball valve within the head of the piston.

The cylinder which houses the plain portion, i. e., that piston not provided with a ball valve, is formed with an annular groove 35 in which is provided a port 36 which communicates with the upper end of the other cylinder via a passage way 37. This groove 35 is positioned in the cylinder so as to be uncovered by the respective piston 28 when said piston is traversed to the end of its stroke by fluid pressure. Pipes 38 and 39 extend from the lower end of each cylinder and are coupled to a pump unit in a manner to be hereinafter described.

The pump unit Fig. 5 associated with said wiper unit comprises a casing 40 in which is mounted in suitable bearings a crankshaft 41 adapted to be rotated by reduction gearing from an electric motor secured to the casing. The crankshaft reciprocates two pistons 42 retained together by a cradle-like component 43 and housed in separate cylinders 44 which are disposed diametrically opposite each other relative to the crankshaft bearing axis and which are secured to the casing.

The capacity of one pump cylinder is approximately ten per cent greater than the capacity of the other pump cylinder, which latter has a capacity equal to the capacities of each of the wiper cylinders. Each pump cylinder is provided with an annular groove 45 in which is provided a port 46 and the ports communicate with a sump 47. The grooves are positioned in the cylinders so as to be uncovered by the respective pistons when said pistons are at their inner dead centre positions. The head end of the smaller capacity pump cylinder has a pipe connection 38, hereinbefore referred to, to the wiper cylinder containing the piston provided with the ball valve, while the head end of the larger capacity pump cylinder has a pipe connection 39, hereinbefore referred to, connected to the other wiper cylinder.

The operation of the apparatus is as follows. On starting the electric motor the crankshaft is thereby rotated to reciprocate the pump pistons so that, considering the pressure stroke of the piston in the larger capacity pump cylinder, liquid is forced into the one wiper cylinder to traverse the piston and its rack and so partially rotate the pinion and thus oscillate the wiper arm. At the end of the stroke of the piston in said piston wiper cylinder, the groove and port in said cylinder are uncovered and the excess liquid passes through said port and associated passage way and thus into the other wiper cylinder containing the piston provided with the ball valve. At this position of the pistons the ball within the ball valve will be resting on the annular slotted member, and thus the excess liquid may pass through the ball valve and be returned to the sump in the pump unit by way of the appropriate pipe connection. It is understood that on the return stroke of said pistons the ball within the ball valve will be seated by the pressure of the liquid being forced up from the pump unit.

Rotation of the pinion by one rack causes the other rack to be moved so that the two racks simultaneously move in opposite directions, said other rack traversing its respective piston to expel liquid from its associated cylinder and said liquid passes via the respective pipe into the appropriate pump cylinder. Continuation of rotation of the crankshaft causes the wiper arm and pinion to oscillate about the common axis.

By each pressure stroke of the piston in the larger capacity pump cylinder, the excess liquid is pumped into the wiper cylinder containing the ball valve so that liquid is continuously circulated through the apparatus from and to the sump. The apparatus is therefore self-bleeding.

Having described my invention what I claim is:

1. A hydraulic windscreen wiper system comprising a two throw pump having two cylinders, one cylinder thereof having a greater swept volume than the other, and a wiper unit having two cylinders each connected to one of the pump cylinders, the total swept volume of the wiper cylinders being less than that of the pump cylinders, wherein the wiper unit comprises a housing, a pinion therein mounted on a shaft adapted to carry a wiper blade, two racks diametrically situated with respect to and engaging with said pinion, a piston in each of said wiper cylinders, each piston being associated with one of said racks whereby motion of each piston in one direction moves the other piston in the other direction, one cylinder having an outlet uncovered by its piston at the end of its pressure stroke, said outlet communicating with the other cylinder between its piston and the pinion through a non-return valve in the other piston.

2. A hydraulic windscreen wiper system comprising a two-throw pump having two cylinders, one cylinder thereof having a greater swept volume than the other, and a wiper unit having two cylinders each connected to one of the pump cylinders, the swept volume of each wiper cylinder being equal to that of the pump cylinder of smaller swept volume, wherein the wiper unit comprises a housing, a pinion therein mounted on a shaft adapted to carry a wiper blade, two racks diametrically situated with respect to and engaging with said pinion, a piston in each of said wiper cylinders, each piston being associated with one of said racks whereby motion of each piston in one direction moves the other piston in the other direction, and an outlet in one cylinder uncovered by its piston at the end of its pressure stroke, said outlet communicating with the other cylinder through a non-return valve in the other piston.

3. A hydraulic windscreen wiper system according to claim 2 wherein said wiper pump comprises a sump and wherein the pump cylinder of greatest swept volume is connected to the wiper cylinder having the outlet uncovered by its piston at the end of its pressure stroke, whereby excess fluid delivered to said wiper cylinder from said pump cylinder of greater capacity passes through said outlet, through the non-return valve in the other wiper piston and back to said sump.

4. A hydraulic windscreen wiper system according to claim 2 wherein a sump supplying said pump cylinders and wherein the non-return valve in said wiper piston comprises a ball valve closed during the pressure stroke of said piston and open on its return stroke to allow excess fluid from the other wiper cylinder to flow therethrough and back to the sump.

HENRY WILLIAM TREVASKIS.

REFERENCES CITED

The following references are of record in the file of this patent:

UNITED STATES PATENTS

| Number | Name | Date |
|---|---|---|
| 375,674 | Greene | Dec. 27, 1887 |
| 677,541 | Gruschow | July 2, 1901 |
| 2,036,100 | Richbourg | Mar. 31, 1936 |
| 2,181,754 | White | Nov. 28, 1939 |
| 2,190,257 | Clench | Feb. 13, 1940 |
| 2,214,922 | Ericson | Sept. 17, 1940 |
| 2,243,385 | Levy | May 27, 1941 |
| 2,389,654 | Van der Werff | Nov. 27, 1945 |
| 2,420,406 | Andrews | May 13, 1947 |
| 2,531,353 | Deloghia | Nov. 21, 1950 |